United States Patent
Weh et al.

(10) Patent No.: US 11,180,129 B2
(45) Date of Patent: Nov. 23, 2021

(54) HYDRAULIC BLOCK FOR A HYDRAULIC UNIT OF A BRAKE CONTROL SYSTEM AND METHOD FOR THE MANUFACTURE THEREOF

(71) Applicant: Robert Bosch GmbH, Stuttgart (DE)

(72) Inventors: Andreas Weh, Sulzberg (DE); Juergen Tandler, Fuessen (DE); Matthias Mayr, Rettenberg (DE)

(73) Assignee: Robert Bosch GmbH, Stuttgart (DE)

(*) Notice: Subject to any disclaimer, the term of this patent is extended or adjusted under 35 U.S.C. 154(b) by 295 days.

(21) Appl. No.: 16/348,741

(22) PCT Filed: Nov. 20, 2017

(86) PCT No.: PCT/EP2017/079755
§ 371 (c)(1),
(2) Date: May 9, 2019

(87) PCT Pub. No.: WO2018/099747
PCT Pub. Date: Jun. 7, 2018

(65) Prior Publication Data
US 2019/0322264 A1    Oct. 24, 2019

(30) Foreign Application Priority Data
Nov. 30, 2016 (DE) .......................... 102016223740.3

(51) Int. Cl.
*B60T 17/04* (2006.01)
*B23P 15/00* (2006.01)
*F15B 13/08* (2006.01)

(52) U.S. Cl.
CPC ............ *B60T 17/04* (2013.01); *B23P 15/001* (2013.01); *F15B 13/0814* (2013.01)

(58) Field of Classification Search
CPC . B60T 8/36; B60T 17/04; B60T 8/368; B60T 8/4031; B60T 8/3685; B23P 15/001; F15B 13/0814
(Continued)

(56) References Cited

U.S. PATENT DOCUMENTS 4,669,791 A * 6/1987 Savill ...................... B60T 17/04
439/34
5,364,067 A * 11/1994 Linkner, Jr. .......... B60T 8/3675
137/454.2
(Continued)

FOREIGN PATENT DOCUMENTS

CN   104870278 A   8/2015
CN   104884316 A   9/2015
(Continued)

OTHER PUBLICATIONS

International Search Report dated Feb. 9, 2018 of the corresponding International Application PCT/EP2017/079755 filed Nov. 20, 2017.

*Primary Examiner* — Bradley T King
*Assistant Examiner* — James K Hsiao
(74) *Attorney, Agent, or Firm* — Norton Rose Fulbright US LLP; Gerard Messina

(57) ABSTRACT

For the purpose of redundancy, ports are provided for a separate power brake pressure unit on a hydraulic block of a hydraulic unit of a slip control system of a hydraulic vehicle power braking system. The ports are attached as cylindrical collars to the hydraulic block by friction welding.

14 Claims, 3 Drawing Sheets

(58) Field of Classification Search
 USPC .................................................. 303/119.3
 See application file for complete search history.

(56) References Cited

U.S. PATENT DOCUMENTS

| | | | | |
|---|---|---|---|---|
| 5,967,625 | A * | 10/1999 | Reuter | B60T 8/348 |
| | | | | 303/116.1 |
| 6,688,707 | B1 * | 2/2004 | Dinkel | B60T 8/368 |
| | | | | 303/119.3 |
| 6,969,128 | B2 * | 11/2005 | Sekihara | B60T 8/368 |
| | | | | 303/113.1 |
| 7,204,566 | B2 * | 4/2007 | Otomo | B60T 8/367 |
| | | | | 303/119.3 |
| 7,207,634 | B2 * | 4/2007 | Yamabuki | B29C 66/53461 |
| | | | | 303/119.3 |
| 7,237,851 | B2 * | 7/2007 | Segawa | B60T 8/368 |
| | | | | 303/119.3 |
| 7,407,234 | B1 * | 8/2008 | McCormick | F15B 13/0885 |
| | | | | 303/119.3 |
| 7,720,589 | B2 * | 5/2010 | Hashiba | B60T 17/02 |
| | | | | 701/83 |
| 8,020,946 | B2 * | 9/2011 | Iyatani | F15B 13/0814 |
| | | | | 303/119.1 |
| 2005/0057092 | A1 * | 3/2005 | Segawa | B60T 8/368 |
| | | | | 303/116.4 |
| 2005/0057093 | A1 * | 3/2005 | Segawa | B60T 8/368 |
| | | | | 303/119.3 |
| 2007/0108836 | A1 * | 5/2007 | Feigel | B60T 13/165 |
| | | | | 303/115.1 |
| 2008/0084108 | A1 | 4/2008 | Crimpita | |
| 2008/0258544 | A1 | 10/2008 | Iyatani | |
| 2010/0138126 | A1 * | 6/2010 | Koyama | B60T 13/686 |
| | | | | 701/70 |
| 2011/0115282 | A1 * | 5/2011 | Dinkel | B60T 7/042 |
| | | | | 303/3 |
| 2013/0299013 | A1 * | 11/2013 | Gnamm | B60T 13/662 |
| | | | | 137/544 |
| 2015/0298675 | A1 * | 10/2015 | Mayr | B60T 8/4081 |
| | | | | 92/169.1 |
| 2016/0280197 | A1 * | 9/2016 | Mayr | B60T 13/662 |

FOREIGN PATENT DOCUMENTS

| | | |
|---|---|---|
| CN | 105000011 A | 10/2015 |
| DE | 19714366 A1 | 10/1998 |
| DE | 10051126 A1 | 5/2001 |
| DE | 102006059924 A1 | 6/2008 |
| DE | 102011086684 A1 | 5/2013 |
| EP | 2907609 A2 | 8/2015 |
| WO | 2012150120 A1 | 11/2012 |

* cited by examiner

HYDRAULIC BLOCK FOR A HYDRAULIC UNIT OF A BRAKE CONTROL SYSTEM AND METHOD FOR THE MANUFACTURE THEREOF

CROSS-REFERENCE TO RELATED APPLICATIONS

The present application is the national stage of International Pat. App. No. PCT/EP2017/079755 filed Nov. 20, 2017, and claims priority under 35 U.S.C. § 119 to DE 10 2016 223 740.3, filed in the Federal Republic of Germany on Nov. 30, 2016, the content of each of which are incorporated herein by reference in their entireties.

FIELD OF THE INVENTION

The present invention relates to a hydraulic block, which is, for example, cuboid, for a hydraulic unit of a brake control system of a hydraulic vehicle braking system, e.g., a power braking system, ad relates to a method of its manufacture. The brake control system is, for example, a control system (or also control unit) of a wheel brake pressure and a brake force of a power braking system or a power-assisted braking system or is a slip control system, for example, an antilock braking system (ABS), traction control system (TCS), and/or vehicle dynamics control system/electronic stability program (VDC/ESP).

BACKGROUND

Such slip control systems of hydraulic vehicle braking systems are known from passenger automobiles and motorcycles and will not be explained in greater detail here. A part of slip control systems is a hydraulic unit. The hydraulic unit includes a hydraulic block equipped with hydraulic components of the slip control system, is connected by brake lines to a master brake cylinder, and is connected to multiple hydraulic wheel brakes by brake lines. Hydraulic components are, inter alia, solenoid valves, hydro-pumps (usually piston pumps), check valves, hydraulic accumulators, damper chambers, and pressure sensors. The hydraulic block is typically a cuboid metal block which is used for mechanical fastening and hydraulic interconnection of the hydraulic components of the slip control system. Interconnection means a hydraulic connection of the hydraulic components in accordance with a hydraulic circuit diagram of the slip control system.

The hydraulic block includes receptacles for the hydraulic components of the slip control system. These are typically cylindrical, usually diameter-graduated counterbores or blind holes, which are applied in the hydraulic block and into which the hydraulic components are completely or partially introduced, for example, pressed in. For example, hydro-pumps are typically introduced completely into their receptacles in a hydraulic block, while in contrast in the case of solenoid valves, only a hydraulic part is introduced into a receptacle of a hydraulic block and an electromagnetic part of the solenoid valves protrudes out of the hydraulic block. The receptacles are connected to one another in accordance with the hydraulic circuit diagram of the slip control system, normally by a Cartesian bore of the hydraulic block. Cartesian bore means boreholes applied in the hydraulic block parallel or perpendicular in relation to one another and to surfaces and edges of the hydraulic block. Equipped with the hydraulic components, the hydraulic block forms a hydraulic unit.

Known hydraulic blocks have ports for brake lines for a connection of the hydraulic block to a master brake cylinder and for connection of wheel brakes to the hydraulic block. The ports are typically cylindrical counterbores or blind holes, which have, for example, female threads for a screw connection of a brake line or can be caulked.

Unexamined application DE 10 2006 059 924 A1 describes one example of a hydraulic block for a slip control system of a hydraulic muscular-power braking system or power-assisted braking system, which also describes receptacles for hydraulic components such as solenoid valves and hydro-pumps, ports for brake lines for connecting the hydraulic block to a master brake cylinder and for connecting hydraulic wheel brakes to the hydraulic block, and a bore of the hydraulic block for a hydraulic connection of the receptacles and ports in accordance with a hydraulic circuit diagram of the slip control system.

Furthermore, international patent application WO 2012/150 120 A1 describes a hydraulic block of a hydraulic power vehicle braking system. The hydraulic block is shown equipped with the hydraulic components such as hydro-pumps and solenoid valves, i.e., as a hydraulic unit of a slip control system. This hydraulic block is not connected to an external master brake cylinder but rather includes a master brake cylinder bore, in which a muscular-power-actuatable master brake cylinder is situated. Moreover, this hydraulic block includes a power cylinder borehole, in which a piston, which is also referred to as a plunger piston, for generating a hydraulic brake pressure for power braking, is displaceably accommodated. The piston is driven using an electric motor via a reduction gear unit and a spindle drive. A hydraulic circuit diagram of the vehicle braking system is shown, a geometry of the hydraulic block is not shown.

SUMMARY

According to an example embodiment of the present invention, a hydraulic block for a hydraulic unit of a brake control system of a hydraulic vehicle braking system, e.g., for a slip control system and/or for a power vehicle braking system, is cuboid and is preferably made of metal. The hydraulic block includes receptacles for solenoid valves and possibly further hydraulic components of the brake control system and ports for hydraulic wheel brakes, which are connected via brake lines. According to the present invention, the hydraulic block includes ports for a power-assisted and/or power brake pressure unit, which is also referred to hereafter in short as a brake pressure unit.

Such a brake pressure unit enables a hydraulic brake force boost by increasing a brake pressure generated using a master brake cylinder and/or a brake pressure generation without pressure buildup in a master brake cylinder. The power-assisted and/or power brake pressure unit includes, for example, an (internal) gear pump, a piston pump, or another hydro-pump, which is drivable using an electric motor, possibly via a reduction gear unit and/or a threaded spindle drive or an eccentric. The brake pressure unit is a separate assembly connected via brake lines to the hydraulic block. The brake pressure unit is redundant to a possible hydro-pump of the hydraulic block and increases the availability, in particular during use of the hydraulic block in a power braking system. Such a redundant brake pressure unit is required, possibly legally prescribed, or in any case advantageous for automated driving without driver intervention. Without driver intervention, namely without actuation of a master brake cylinder, braking is not possible in known power vehicle braking systems in the event of failure of the power.

One advantage of the present invention is that an existing hydraulic block of a slip control system and/or a power braking system is usable with few changes. Another advantage of the present invention is that ports for the wheel brakes and—if a master brake cylinder is not integrated into the hydraulic block—ports for a master brake cylinder can remain at their provided points of the hydraulic block. Dimensions and ports of the hydraulic block can thus remain unchanged, whereby no changes have to be carried out for the installation and connection of the hydraulic block in a vehicle. Still another advantage of the present invention is that components of existing hydraulic units are usable unchanged. These include in particular a cylinder and a piston/plunger piston of a piston-cylinder unit, a ball screw drive, a planetary gear, and an electric motor of an electrohydraulic power brake pressure generator, which form one or two pre-installable assembly group(s).

According to an example embodiment, one or multiple port(s) for a master brake cylinder, one or multiple port(s) for hydraulic wheel brakes, and/or one or multiple port(s) for a power braking unit is/are furnished with a collar, which is integrally joined, for example, by welding, on the hydraulic block. The collar or collars protrude from the hydraulic block and are provided for a connection of brake lines. They include, for example, a female thread or possibly a male thread for connecting a brake line using a screwed nipple or are designed for connecting a brake line using a press nipple. The list is by way of example and is not exhaustive. The collars communicate pressure-tight with a bore of the hydraulic block due to their integrally joined attachment on the hydraulic block. In this way, arbitrary ports of the hydraulic block can be manufactured. Ports of the hydraulic block for a brake pressure unit are not required for the method according to the present invention.

The present invention is explained in greater detail hereafter on the basis of an example embodiment illustrated in the drawings, in which the figures are partly simplified and are not true to scale.

DETAILED DESCRIPTION

Figure 1:
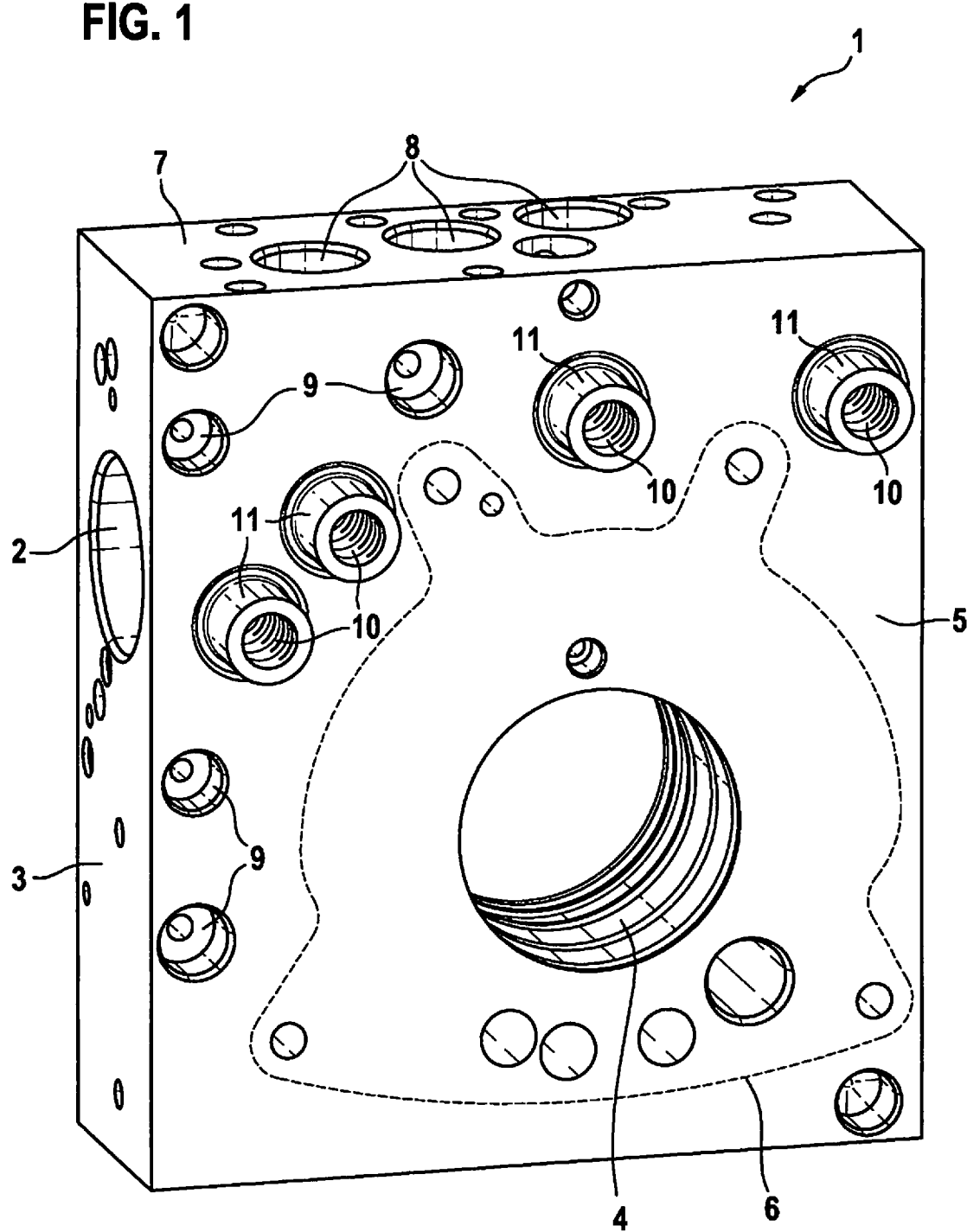
FIG. 1 is a perspective view of a hydraulic block according to an example embodiment of the present invention.

Hydraulic block 1 according to the present invention shown in FIG. 1 is provided for a hydraulic unit of a slip control system of a hydraulic vehicle braking system (otherwise not shown). Such slip control systems are, for example, antilock braking systems (ABS), traction control systems (TCS), and/or vehicle dynamics control systems/electronic stability programs (VDC/ESP). Hydraulic block 1 is a cuboid metal block, which is somewhat longer than wide and is multiple times wider than thick.

Hydraulic block 1 is provided for a power vehicle braking system, which includes a master brake cylinder bore 2, that passes through from one longitudinal side 3 to an opposing longitudinal side of hydraulic block 1, and a power cylinder bore 4, that passes through perpendicularly to master brake cylinder bore 2 from an engine side 5 to an opposing control unit side of hydraulic block 1. Engine side 5 and the control unit side are the two large sides of cuboid hydraulic block 1; they can also be referred to as the base side and the top side. Engine side 5 is provided for fastening an electric motor (not shown) and control unit side is provided for fastening an electronic control unit (also not shown). The electronic control unit carries out the slip control, receives signals from wheel speed sensors and pressure sensors, and controls and/or regulates electrohydraulic components, in particular solenoid valves and the electric motor (not shown) of the slip control system. An area of engine side 5 of hydraulic block 1 covered by a fastening flange 6 of a motor housing of the electric motor is shown by dashed lines in the figure. Master brake cylinder bore 2 and power cylinder bore 4, which penetrate hydraulic block 1 perpendicularly to each other, are offset relative to each other so that they do not intersect.

Master brake cylinder bore 2 is provided for pressing in a master brake cylinder (not shown), into which two master brake cylinder pistons, namely a primary piston or rod piston and a secondary piston or floating piston are inserted axially displaceably. An actuation of master brake cylinder takes place in a known manner via muscular power using a brake pedal (not shown). Therefore, hydraulic block 1 includes an integrated dual-circuit master brake cylinder. Its design and function correspond to conventional master brake cylinders.

A brake fluid reservoir (not shown) is attached to a narrow side 7 of hydraulic block 1, which includes three ports 8 for the brake fluid reservoir. Ports 8 for the brake fluid reservoir are cylindrical blind holes in hydraulic block 1 for a fluid-tight connection of the brake fluid reservoir.

Ports 9 for—in the example embodiment—four hydraulic wheel brakes are applied as cylindrical blind holes outside fastening flange 6 of the electric motor in engine side 5 of hydraulic block 1. They can include, for example, female threads for connecting brake lines using screwed nipples. In the example embodiment, ports 9 for the wheel brakes are provided threadless for connecting brake lines using press nipples.

Power cylinder bore 4 is provided for pressing in a power cylinder (not shown), into which a power piston is inserted axially displaceably. For power-assisted braking, the power piston is displaced in the power cylinder using the electric motor (not shown) fastened on engine side 5 of hydraulic block 1 via a reduction gear unit and a spindle drive and generates a hydraulic brake pressure for actuating the vehicle braking system and the wheel brakes (not shown) connected thereto via the brake lines. The power cylinder including the power piston can also be understood as a piston pump and in general as a hydro-pump, the power piston is also referred to as a plunger piston. In the case of power-assisted braking, the vehicle braking system is not actuated using the master brake cylinder, which is used in the case of power-assisted braking as a setpoint value generator for a brake pressure or a brake force to be generated using the power piston in the power cylinder. In the case of emergency braking in the event of failure of the electric motor, the vehicle braking system is actuated by muscular power using the master brake cylinder.

Hydraulic block 1 also has receptacles for solenoid valves of the slip control system in the control unit side (not visible in the drawing). The receptacles for the solenoid valves are cylindrical, diameter-graduated blind holes, into which the solenoid valves are pressed pressure-tight. Armatures of the solenoid valves protrude from the control unit side. Hydraulic block 1 includes further receptacles for hydraulic components of the slip control systems such as hydraulic accumulators, damper chambers, and check valves, which will not be discussed in greater detail here, because such hydraulic blocks for slip control systems of hydraulic muscular-power, power-assist, and power vehicle braking systems are known.

On engine side 5, hydraulic block 1 includes four ports 10 for a power brake pressure unit (not shown), which is also referred to in short hereafter as a brake pressure unit. The brake pressure unit is a separate assembly group which is connected via four brake lines 15 to the four ports 10 of hydraulic block 1. The power brake pressure unit includes two piston pumps as hydro-pumps, which are driven using an electric motor via an eccentric. Furthermore, it includes solenoid valves and check valves for controlling a flow rate of brake fluid. The power brake pressure unit forms a separate and redundant brake pressure generator for a power actuation of the vehicle braking system in the event of failure of the electric motor of the power piston. It has a supply line and a return line for each of its piston pumps, which are connected as described using brake lines 15 to ports 10 for the power brake pressure unit of hydraulic block 1. The power brake pressure unit includes a hydro-pump having a supply line and a return line for each brake circuit, i.e., two hydro-pumps each having two ports for a dual-circuit vehicle braking system.

Ports 10 for the power brake pressure unit include tubular collars 11 protruding from engine side 5 of hydraulic block 1 and female threads for connecting brake lines 15 of power brake pressure unit using screwed nipples 16. A threadless port having press nipples is also possible here. Collars 11 extend a hole of ports 10 and thus increase a mechanical strength against loosening of connected brake lines 16. If shorter holes are sufficient for the ports or sufficient space is available in hydraulic block 1, ports 10 for the power brake pressure unit can also be designed as blind holes without collars 11. Ports 10 for the power brake pressure unit can be situated differently for different installation positions of hydraulic block 1.

Figure 2:
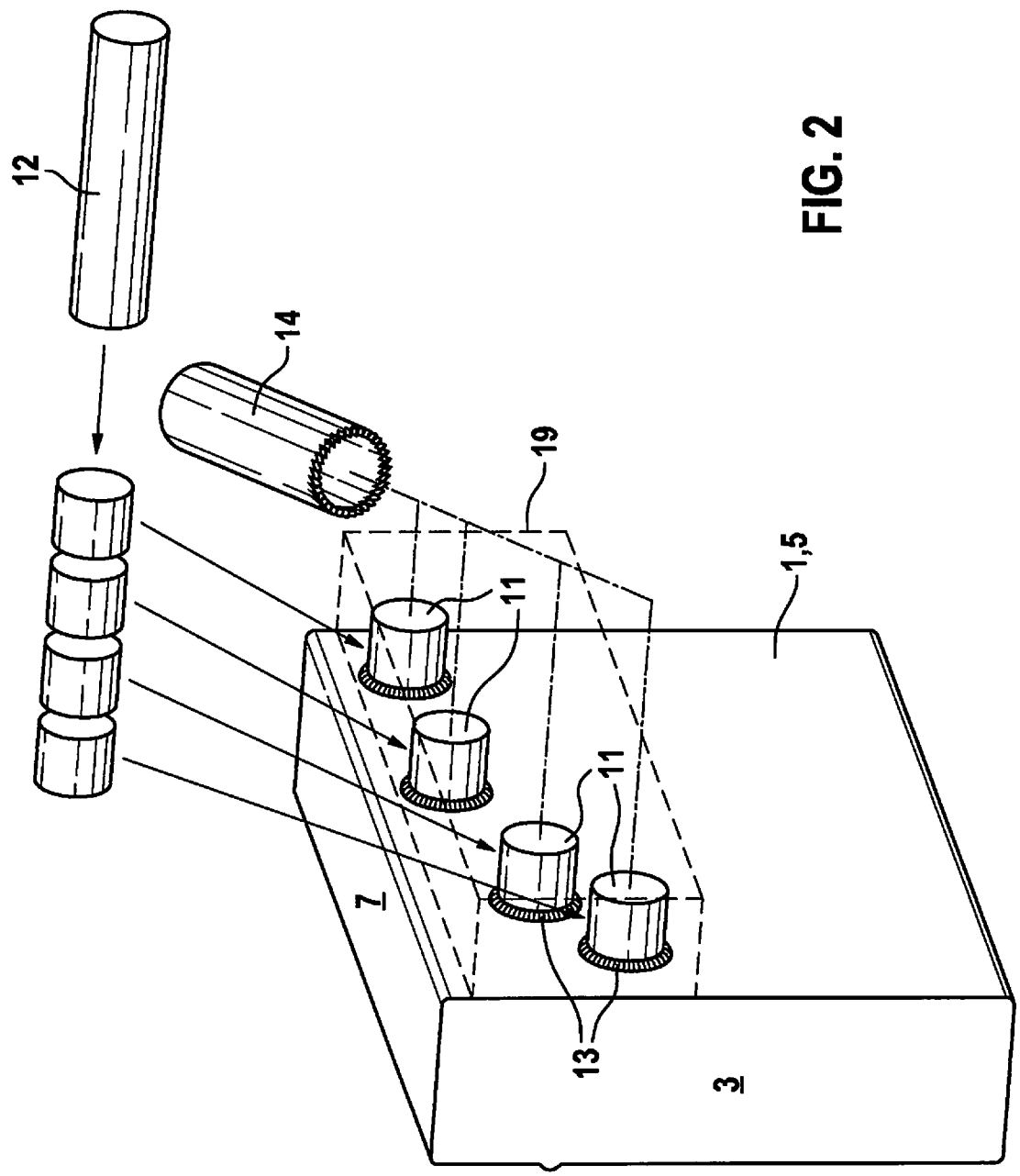
FIG. 2 shows the hydraulic block from FIG. 1 during manufacturing of ports for brake lines, according to an example embodiment of the present invention.
Figure 3:
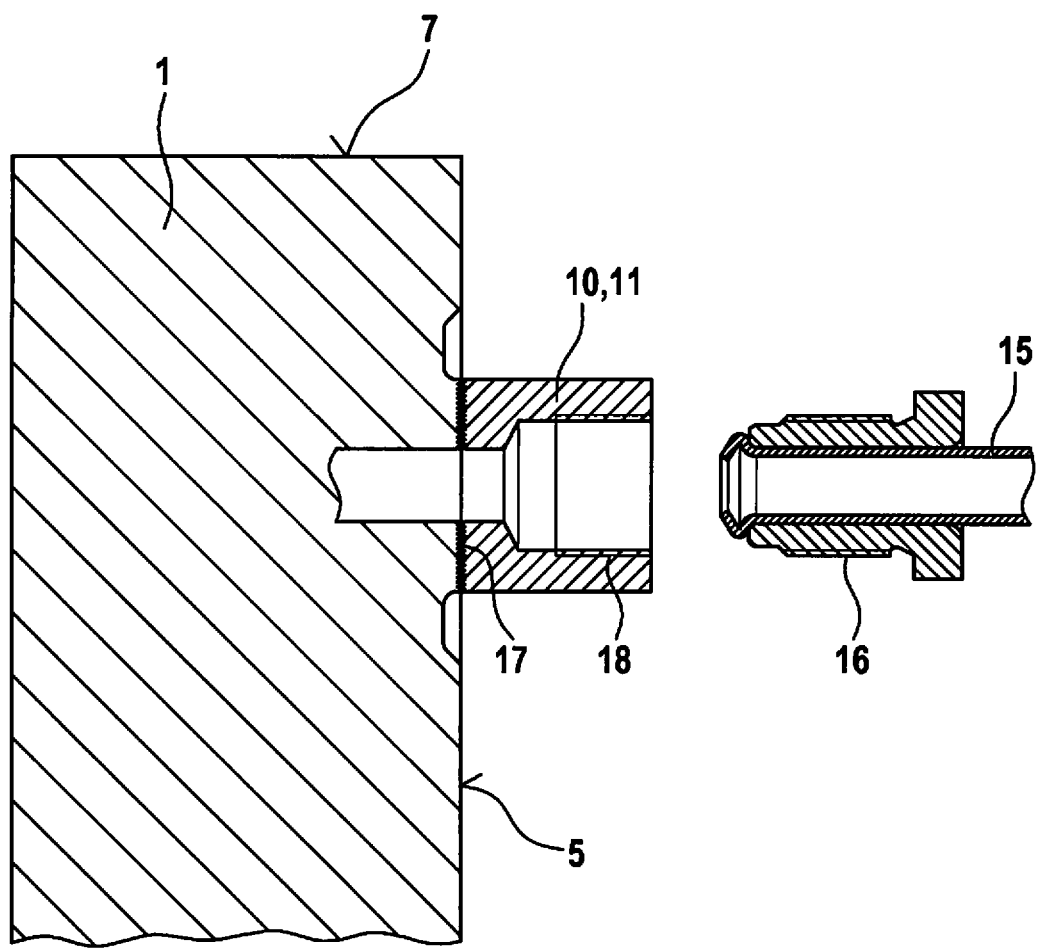
FIG. 3 shows a portion of the hydraulic block from FIG. 1 including a port for a brake line in axial section, according to an example embodiment of the present invention.

To manufacture ports 10 for the power brake pressure unit, pieces are severed from a cylindrical rod 12 as shown in FIG. 2 and integrally joined, in particular by friction welding, at provided points to engine side 5 of hydraulic block 1 (FIG. 3). The attachment is also possible on sides other than engine side 5. In the example embodiment, the cylindrical pieces are fastened by friction welding on hydraulic block 1, integral joint 17 being flush and pressure-tight. A peripherally uninterrupted continuous pressure-tight connection on a circumference of the cylindrical pieces is required.

Cylindrical rod 12, from which the cylindrical pieces used for manufacturing ports 10 are severed, is made, for example, from the same material as hydraulic block 1, for example, from an aluminum alloy. The manufacture of hydraulic block 1 and cylindrical rod 12 is carried out, for example, by forming, for example, by extrusion, hydraulic block 1 being formed as a rectangular profile and severed, for example, sawed off.

After the integral joining of the cylindrical pieces forming ports 10 on hydraulic block 1, a welding bead 13 or the like on a circumferential inner corner at a transition from the cylindrical pieces to hydraulic block 1 can be removed by machining. For example, the inner edge is machined using a crowning cutter 14. A visually appealing and rounded transition, which in particular avoids mechanical tension peaks due to an inner corner, from the cylindrical pieces to hydraulic block 1 can thus be manufactured, as shown as a detail in FIG. 3. The transition from the cylindrical pieces to engine side 5 or another side of hydraulic block 1 is referred to here as an inner edge, even if the transition does not include an "edge," but rather is defined, for example, by the shape of welding bead 13.

Before or after the machining of the inner corner on the outer circumference of the cylindrical pieces, from which collars 11 were or are manufactured, the cylindrical pieces are drilled through coaxially and up into hydraulic block 1, and ports 10 are thus manufactured. The bores applied through the cylindrical pieces up into hydraulic block 1 are part of a bore (to be explained hereafter) of hydraulic block 1 for the hydraulic connection of the hydraulic components of the slip control system. In the example embodiment, collars 11 manufactured from the cylindrical pieces are provided with a female thread for connecting brake lines 15 using screwed nipples 16. Male threads (not shown) or threadless ports for a connection of brake lines 16 using press nipples are also possible, for example.

Ports 9 for the hydraulic wheel brakes can also be designed having collars attached by friction welding or integrally joined in another way instead of their design as blind holes (not shown). A design of ports 9 for the hydraulic wheel brakes and/or for a connection of a master brake cylinder using collars are also possible on a hydraulic block 1 which is not provided for an external power brake pressure unit and which does not include ports 10 for a power brake pressure unit.

The manufacture of ports 10 for the power brake pressure unit or in general of ports for brake lines 16 as collars 11 integrally joined on hydraulic block 1 has the advantage of material and time savings in comparison to machining. A one-piece manufacture of collars 11 for connecting brake lines 16 in one piece by cutting hydraulic block 1 is also possible, hydraulic block 1 having to be thicker in this case by a height of collars 11 than if collars 11 are integrally joined, for example, by welding or friction welding, on hydraulic block 1. Hydraulic block 1 preferably has a greater thickness 19 for the machining of collars 11 only in the area of collars 11, which can be formed by extrusion of hydraulic block 1. Greater thickness 19 of hydraulic block 1 in the area of collars 11 for the machining of collars 11 is indicated by dashed lines in FIG. 2. It is removed by machining outside collars 11, in particular milled away. Greater thickness 19 is absent in the case of the integral joining of collars 11, in particular by friction welding, on hydraulic block 1.

Ports 8 for the brake fluid reservoir, ports 9 for the wheel brakes, ports 10 for the power brake pressure unit on engine side 5 of hydraulic block 1, receptacles (not visible) for the solenoid valves of the slip control system on the control unit side of hydraulic block 1, the further receptacles for hydraulic components of the slip control system, master brake cylinder bore 2, and power cylinder bore 4 are connected to one another in accordance with a hydraulic circuit diagram of the slip control system by a not visible bore of hydraulic block 1. Ports 10 for power brake pressure unit (not shown) are drilled coaxially through collars 11 into hydraulic block 1, as shown in FIG. 3. Subsequently, female threads 18 for screwed nipples 16 are cut into collars 11. Due to the bore of hydraulic block 1, in each brake circuit, a port 10 for a supply line to the power brake pressure unit is connected to master brake cylinder bore 2 and ports 9 for the wheel brakes of a brake circuit are connected to particular port 10 for a return line from the power brake pressure unit. Equipped with the hydraulic components, hydraulic block 1 forms a hydraulic unit and the core part of the slip control system.

Hydraulic block 1 is drilled in a Cartesian manner, i.e., ports 8, 9, 10, the receptacles for the solenoid valves and other hydraulic components of the slip regulator, master brake cylinder bore 2, and power cylinder bore 4 are applied in hydraulic block 1 in parallel and perpendicular to one another and to surfaces and edges of hydraulic block 1. Individual, diagonally extending bores are not precluded.

Master brake cylinder bore 2 is not connected by the bore inside hydraulic block 1 to ports 9 for the wheel brakes, but rather is hydraulically connected to ports 9 for the wheel brakes by the connection of the redundant power brake pressure unit (not shown) to its ports 10 on hydraulic block 1. Master brake cylinder bore 2 and the master brake cylinder are thus connected to the wheel brakes by the power brake pressure unit.

What is claimed is:

1. A hydraulic vehicle braking system comprising:
a supply line of a power brake pressure unit;
a return line of the power brake pressure unit; and
a hydraulic block comprising:
   a port to a brake fluid reservoir;
   a master brake cylinder bore in which part of a master brake cylinder is received;
   a power cylinder bore in which a power piston of a power cylinder is axially displaceable under power of a motor for actuating wheel brakes without use of the master brake cylinder;
   receptacles for solenoid valves of the brake control system;
   first ports for hydraulic wheel brakes; and
   second ports;
   wherein:
      the second ports include a port that is hydraulically connected to the master brake cylinder bore and to the supply line of the power brake pressure unit and a port that is hydraulically connected to the return line of the power brake pressure unit and to the first ports, so that the master brake cylinder is hydraulically connected to the hydraulic wheel brakes only via the power brake pressure unit; and
      the power brake pressure unit includes a pump driven by an electric motor other than the motor of the power piston, and is configured to provide brake pressure in case of failure of the power piston.

2. The hydraulic block of claim 1, wherein the second ports are situated on an engine side of the hydraulic block.

3. The hydraulic block of claim 1, wherein the port of the second ports that is hydraulically connected to the master brake cylinder bore and to the supply line of the power brake pressure unit is connected to the master brake cylinder bore via a connecting bore.

4. The hydraulic block of claim 3, wherein the master brake cylinder bore does not communicate with any of the first ports except via the power brake pressure unit.

5. The hydraulic block of claim 1, wherein one or both of (a) the first ports and (b) the second ports include collars.

6. A method comprising:
providing a supply line of a power brake pressure unit;
providing a return line of the power brake pressure unit;
providing a hydraulic block of a brake control system including a port to a brake fluid reservoir, a master brake cylinder bore in which part of a master brake cylinder is received, and a power cylinder in which a power piston of a power cylinder is axially displaceable under power of a motor for actuating wheel brakes without use of the master brake cylinder, receptacles for solenoid valves of the brake control system, first ports for hydraulic wheel brakes, and second ports, wherein:
   the second ports include a port that is hydraulically connected to the master brake cylinder bore and to the supply line of the power brake pressure unit and a port that is hydraulically connected to the return line of the power brake pressure unit and to the first ports, so that the master brake cylinder is hydraulically connected to the hydraulic wheel brakes only via the power brake pressure unit;
   the power brake pressure unit includes a pump driven by an electric motor other than the motor of the power piston, and is configured to provide brake pressure in case of failure of the power piston;
   one or both of (a) the first ports and (b) the second ports include collars; and
   the providing of the hydraulic block with the first and second ports includes integrally joining the collars to the the hydraulic block.

7. The method of claim 6, further comprising forming the collars by severing two or more of the collars from a single rod, wherein subsequent to the severing, the integral joining of the formed collars to the hydraulic bock is performed.

8. The method of claim 6, further comprising performing machining that removes a welding bead at a circumferential inner transition from one or more of the collars to the hydraulic block.

9. The method of claim 6, further comprising boring a bore through one of the collars, into a body of the hydraulic block.

10. A hydraulic vehicle braking system comprising:
a line of a power brake pressure unit; and
a hydraulic block comprising:
   a master brake cylinder bore in which part of a master brake cylinder is received;
   a power cylinder bore in which a power piston of a power cylinder is axially displaceable, under power of a motor situated at a motor side of the hydraulic block, for actuating wheel brakes without use of the master brake cylinder, wherein the power brake pressure unit completely external to the hydraulic block and is separate from the power piston of the power cylinder in order for a braking to be performable using the power brake pressure unit independent of a braking that is performable using the power piston;
   receptacles for solenoid valves of the brake control system;
   first ports for hydraulic wheel brakes arranged on the motor side of the hydraulic block, wherein the master brake cylinder bore is not connected within the hydraulic block to any of the first ports; and
   second ports arranged on the motor side of the hydraulic block and including a port to a line of the power brake pressure unit.

11. The hydraulic vehicle braking system of claim 10, wherein the second ports further include a port that is hydraulically connected in the hydraulic block to the master brake cylinder bore.

12. The hydraulic vehicle braking system of claim 10, wherein at least one of the second ports is connected in the hydraulic block to at least one of the first ports.

13. The hydraulic vehicle braking system of claim 10, wherein the hydraulic block includes a connecting bore via which one of the second ports communicates with the master brake cylinder bore and another of the second ports communicates with one of the first ports.

14. The hydraulic vehicle braking system of claim 10, wherein one or both of (a) the first ports and (b) the second ports include collars.

* * * * *